Feb. 28, 1956 J. KUHN 2,736,198
FLUID STREAM DIRECTION INDICATOR
Filed Aug. 31, 1951
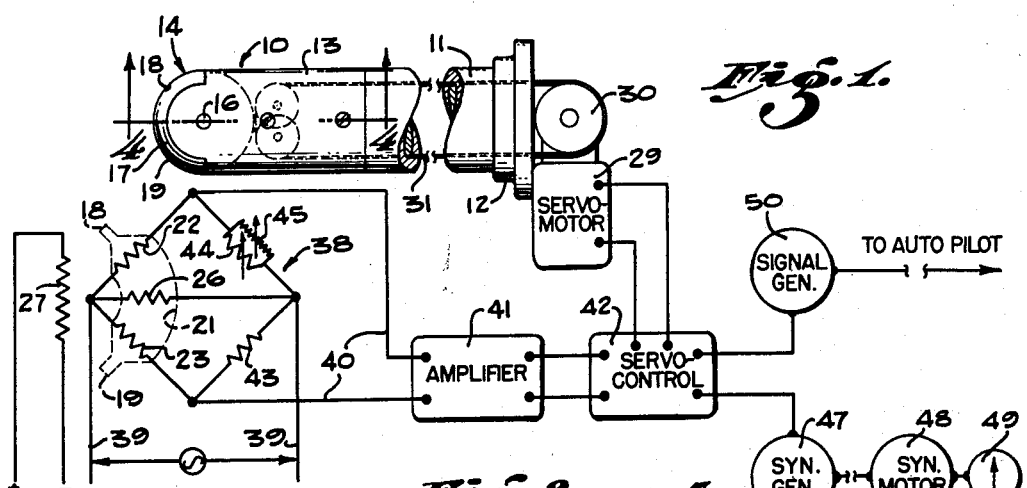
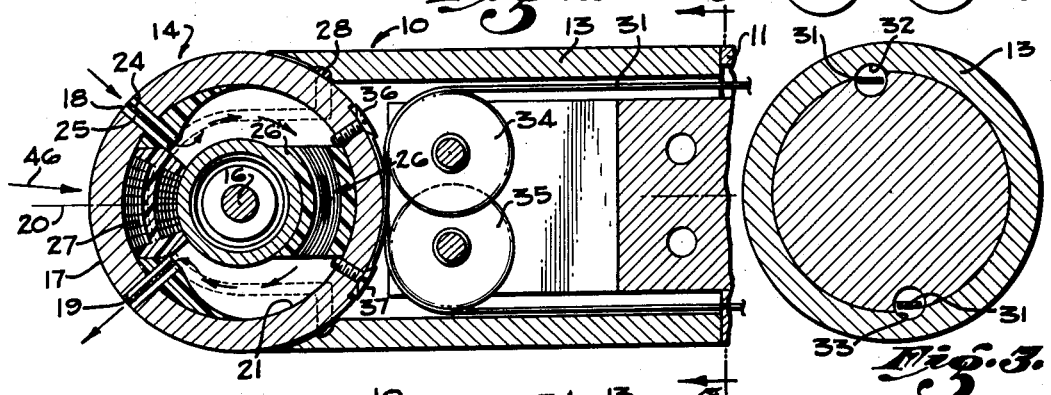
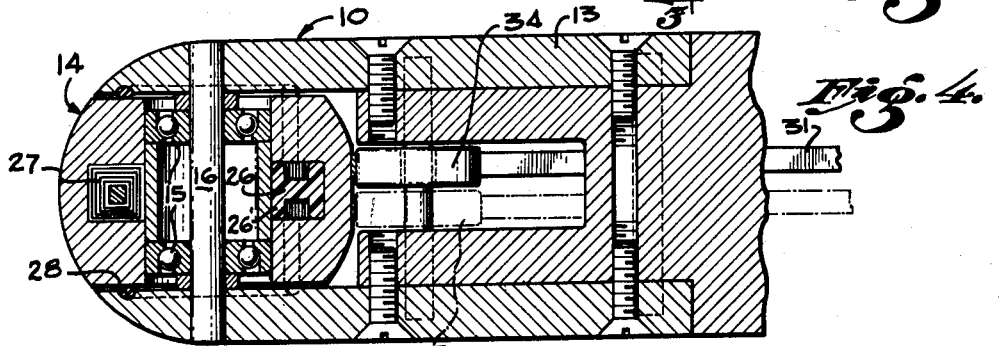
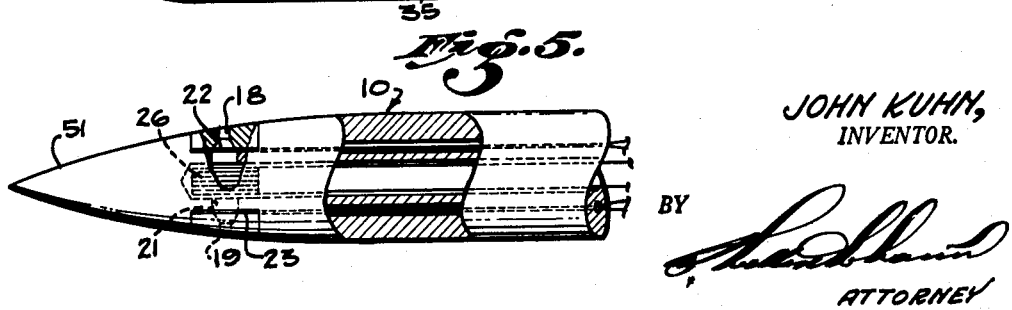
JOHN KUHN,
INVENTOR.
BY
ATTORNEY

United States Patent Office 2,736,198
Patented Feb. 28, 1956

2,736,198

FLUID STREAM DIRECTION INDICATOR

John Kuhn, Los Angeles, Calif., assignor to The Garrett Corporation, Los Angeles, Calif., a corporation of California Application August 31, 1951, Serial No. 244,633

4 Claims. (Cl. 73—180)

The present invention relates generally to devices for determining the direction of flow of fluids, and is more particularly concerned with means for indicating the direction of flow of fluids such as air, water and the like.

The device of the present invention is susceptible of a variety of uses. The device is especially useful in connection with aircraft when embodied in instruments for indicating the plane attitude, for example, yaw and pitch; and for indicating the direction of air flow. It may also be utilized to control a signal generator forming a part of an automatic pilot system. Further, the device is susceptible of utilization in other applications, for example, indicating angles of deviation with respect to an undisturbed airstream in testing models in wind tunnels, and to define flow contours around air foils in cascades and through ducts.

It is one object of the herein described invention to provide an improved device for indicating the direction of a fluid stream such as air, water and the like, which utilizes novel sensing means of such character that an output will be obtained directly in the form of an electrical signal.

A further object is to provide in connection with such a device, novel control by means of which the direction of flow of a fluid stream and direction sensing means therein may be relatively varied.

Another object of the invention is to provide in a fluid stream direction sensing device, a novel signal transmitter which will work over a wide range of temperature and density, this transmitter being connectible with various types of use circuits, for example, direction indicators, automatic pilot systems, etc.

Still another object of the invention is to provide a sensing device in which the component parts and manner of operation are such as to enable embodiment into a sensing head of extremely compact size, and yet will be reliable and efficient in operation, have a high degree of sensitivity and a minimum of error.

Briefly, the present invention comprises a suitable body structure containing a sensing head that may be positioned in a fluid stream the direction of flow of which is to be determined. This head is provided on opposite sides of its axis with surface fluid flow openings positioned in angular relation and communicating with an interior duct in the head. In the simplified form of the invention, temperature responsive resistor elements are mounted within this duct adjacent the respective surface openings while in another form, a heating element is positioned between the resistor elements. When the sensing head is positioned in a fluid stream with its axis at an angle to the direction of stream flow, fluid flow will take place through the duct due to the pressure differential set up at the two duct openings. This flow will cause a temperature change in the resistor elements and a consequent change of their resistance values.

The resistor elements are incorporated in a suitable amplifying and evaluating circuit having its output connected to a use circuit which may be connected with suitable indicating instruments or form a part of an automatic pilot system, etc.

Provision is made for relatively moving the direction of stream flow and the axis of the head portion of the sensing means. One manner in which this relative movement may be accomplished is by utilizing a servo-motor for moving the sensing head, the servo-motor being connected through a suitable transmission with the head portion and controlled by the amplifying and evaluating circuit in accordance with changes in the resistor elements.

Further objects of the invention will be brought out in the following part of the specification, wherein detailed description is for the purpose of fully disclosing several embodiments of the invention without placing limitations thereon.

Referring to the accompanying drawings, which are for illustrative purposes only:

Fig. 1 is a view diagrammatically showing the present invention, and the control circuits and electrical interconnections thereof;

Fig. 2 is a horizontal section taken through the head portion of the sensing means;

Fig. 3 is a transverse section, taken substantially on line 3—3 of Fig. 2;

Fig. 4 is a section taken substantially on line 4—4 of Fig. 1; and

Fig. 5 is a modified embodiment of the invention.

Referring now generally to the drawings, for illustrative purposes the invention is shown as embodying sensing means, as generally indicated by the numeral 10, which are supported in this instance upon a suitable support such as a hollow boom 11 anchored at one end in a supporting bracket 12. This particular arrangement is for installations wherein it is desired to support the sensing means, for example, in advance of a moving body such as an airplane so that the head end of the sensing means will be virtually disposed in undisturbed air.

As more specifically disclosed in Fig. 2, this particular embodiment utilizes a construction wherein the sensing means has a substantially tubular portion 13 which forms in effect a connecting extension between the associated end of boom 11 and a movably mounted sensing head 14.

The head end of the sensing means may, of course, embody different shapes, depending upon the relative velocity between the sensing means and the fluid flow which is being sensed. A spherical shape is considered desirable for use at relatively low velocities because the large air flows resulting from the relatively high pressure differentials obtainable would result in maximum sensitivity. At relatively high speeds a spherical head is undesirable because of its low critical speed, and in such case a conical or ogive shape is utilized.

In the embodiment chosen for illustrative purposes as disclosed in Fig. 2, the head 14 is shown as being of spherical shape and rotatably supported for limited movements by means of anti-friction bearings 15—15 upon a shaft 16. As thus arranged, the head 14 has an exposed curved leading surface 17 facing into the stream of fluid flow.

As shown in Fig. 2, the surface 17 is provided with angularly positioned openings 18 and 19 which are symmetrically positioned on opposite sides of the longitudinal axis 20 of the sensing means. These openings 18 and 19 communicate respectively with the opposite ends of a duct 21 within the spherical head 14.

Thermally sensitive resistor elements 22 and 23 are positioned at the ends of the duct 21 adjacent the respective openings 18 and 19. These elements may be constructed in a variety of forms. For example, small wire coils 24 of suitable conductor may be mounted in the bore of an insulating sleeve 25 which is supported in the associated opening 18 or 19, the bore of the sleeve in this case forming a flow passage connecting with the duct 21 for flow of fluid, the direction of which is being sensed.

Centrally positioned in the duct 21 is a heater 26. In this embodiment, this heater is shown as comprising an insulating support 26' of generally H-section, heating coils being supported on opposite sides of the connecting web portion and suitably spaced to leave flow ducts for the flow of fluid from one end of the duct 21 to the other.

Diametrically opposite the heater 26, a second heater 27 is positioned between the openings 18 and 19 for heating this portion of the head surface so as to prevent ice formation during operation. The inner ends of the sleeves 25 are anchored within a heat insulating plastic which protects the thermally sensitive elements against unsymmetrical heating from the de-icing heater 27. Although not shown, it may be necessary to regulate the temperature of heater 27 in order to provide sufficient heat for de-icing under all conditions and yet not over heat the head so as to cause damage to the bearings or other mechanical trouble under any conditions.

The spherical head 14 is sealed with respect to the portion 13 by means of a suitable gasket 28 between their contacting surfaces.

Provision is made for rotating the head 14 about the shaft 16 by providing a suitable power actuating device, which in this instance comprises a servo-motor 29 having a driving drum or pulley 30 around which a flexible band 31 of suitable material is trained, the end portions of this band being carried through the interior of the hollow boom 11 and passageways 32 and 33 over rotatably mounted pulleys 34 and 35, the ends of the band being respectively carried in opposite directions and connected to the associated wall of the head 14 by spaced anchor screws 36 and 37, respectively. By placing the band 31 under tension, it will be appreciated that a motion transmitting connection is effected between the servo-motor and the head 14 that will be free of lost motion or back-lash which would result in erroneous indications.

The servo-motor 29 is controlled in its direction of rotation in accordance with the direction of unbalance of a Wheatstone bridge circuit, as generally indicated by the numeral 38. This bridge circuit has its input connected to a suitable electrical source by conductors 39—39, and its output connected to conductors 40—40 which are carried to a conventional amplifier 41 by means of which the signal from the bridge circuit is amplified and introduced into a servo-control 42. In brief, the servo-control is arranged to cause actuation of the servo-motor in one direction when the bridge is unbalanced one way, and reverse the direction of rotation of the servo-motor when the bridge is oppositely unbalanced.

As shown in Fig. 1, the thermally sensitive resistor elements 22 and 23 are connected into two legs of the bridge circuit, the other two legs of the bridge having respectively a fixed resistor 43, and a variable resistor composed of two rheostats in parallel, one of these being of low resistance as indicated at 44 for coarse adjustment, and the other of high resistance, as indicated at 45 for fine adjustments.

With the arrangement described above, the bridge circuit is balanced for a condition in which the direction of flow of the fluid stream is symmetrical with respect to the openings 18 and 19. Assuming that the head 14 is in a position as shown in Fig. 2, and the fluid flow corresponds in direction with the central axis 20, then flow through the duct 21 will be nullified. If the flow direction of the fluid stream and the axis 20 are relatively disaligned as indicated by the arrow 46, a pressure differential will be set up at the duct openings 18 and 19 which will cause fluid flow in the duct 21 from the opening 18 to opening 19. Since the thermally sensitive resistor elements 22 and 23 are heated by the current passing therethrough, the flow of fluid will tend to cool the element 22, and the element 23 will be additionally varied in a different degree by the fluid which was previously heated by element 22, so that the bridge circuit 38 will be unbalanced in one direction. The resulting signal is transmitted to the servo-control which is arranged to operate the servo-motor under such conditions in a direction to move the head 14 in the proper direction to again symmetrically dispose the openings 18 and 19 with respect to the fluid flow direction, whereupon the bridge circuit is again balanced and further operation of the servo-motor ceases. It will therefore be apparent that the amount of relative movement required to align the head 14 and the fluid stream flow direction, serves as an indication of the angle of wind with respect to the axis 20.

Provision may be made for remotely indicating the fluid flow angle by connecting a synchronous generator 47 with the servo-control, this generator having its output connected with a remotely located synchronous motor 48 which is adapted to operate as a slave unit and actuate a visual indicator 49, all in a manner well understood in the art.

Moreover, the signal from the Wheatstone bridge circuit 38 may be utilized to actuate a signal generator 50, such as may form a part of an automatic pilot system. Such uses are indicated for the purpose of illustrating examples of use circuits which may be connected with the device of the present invention, and it will be clearly evident that the device is readily susceptible of use with other use circuits.

In its simplest form, satisfactory operation is obtained by utilizing the thermally sensitive elements 22 and 23 only, under conditions where extreme sensitivity is not a requirement. Where very fine indications are required, the sensitivity is increased by utilizing the heater 26 which raises the temperature of fluid flowing through the duct 21, in its passage from the element 22 to the element 23, or vice versa.

Referring to Fig. 5, there is illustrated a modified construction in which the sensing means is formed with conical or ogive end 51, which is adapted for high velocities of fluid flow, and also permits embodiment of the present invention into a small elongate probe which is particularly adapted for certain uses. Corresponding parts to those previously described are indicated by the same numerals.

By utilizing the thermally sensitive elements only, that is, elements 22 and 23, the sensing means may readily be constructed to form a probe type head which may be in the order of one-tenth inch in diameter. In utilizing a small probe of this type, the output circuit of the Wheatstone bridge may be directly connected to a galvanometer or suitable indicating circuit so that the angle of disalignment will readily be indicated and show the angular deviation of the displaced airstream from its initial position. For example, if the probe is initially aligned in the flow stream, with its pointed end against the directon of flow, and held in this position, relative change in the direction of flow will be indicated as a result of the flow through its duct 21. The angle of deviation may also be indicated by first initially positioning the probe, as just explained, and then moving it until it is again aligned with the shifted flow axis, in which case the angle will be indicated directly by the angular change of the probe itself. Such an arrangement may be utilized to indicate angles as small as one-fourth of a degree, which should be adequate for flow survey around air foils in ducts, through cascades, etc. The speed of response of this type of device is of the order of one millisecond.

Utilizing the same general shape as shown in Fig. 5, the precision of the device may be increased by additionally utilizing the heater 26. This requires a head of larger size, for example, two-tenths of an inch in diameter. By utilizing suitable amplifiers and regulating the current through the thermally sensitive elements, the sensitivity of this type of sensing device can be increased until disalignments smaller than one-hundredth of a degree can be measured accurately. The time constant can be reduced below fifty microseconds so that minute fluctuations in the direction can be detected. Because of this high degree of sensitivity, it may be necessary under some circumstances to provide statistical averaging circuits in order that the mean direction of the airstream can be determined by eliminating the extraneous effects from turbulences within the airstream.

Various modifications may suggest themselves to those skilled in the art without departing from the spirit of my invention, and hence, I do not wish to be restricted to the specific forms shown or uses mentioned, except to the extent indicated in the appended claims.

I claim:

1. In a fluid stream direction indicator: a sensing head adapted to be exposed to the fluid stream; a duct in said sensing head having its ends terminating in spaced openings in said sensing head, said duct being closed from one of said openings to the other whereby a differential of pressure at said openings will cause passage of fluid through said duct from one opening to the other and fluid passage through said duct is nullified with equal pressure at said openings resulting from symmetrical disposition of said openings with respect to the direction of the fluid stream; first and second heated resistance elements in spaced relationship longitudinally within said duct so as to be successively contacted by fluid passing through said duct, said resistance elements having the characteristic of change in resistance with change in temperature, passage of fluid in either direction through said duct causing cooling of the first contacted element of said resistance elements to a greater degree than the second contacted element of said resistance elements; an electrical circuit including said resistance elements and means for heating such elements, said circuit providing an output voltage whose sign reverses in accordance with the direction of fluid flow past said resistance elements; means controlled by said circuit and responsive to changes in said output voltage for moving said sensing head in a direction to establish symmetrical disposition of said openings with respect to the direction of the fluid stream; and means controlled by said circuit for indicating the fluid stream direction.

2. In a fluid stream direction indicator; a sensing head adapted to be exposed to the fluid stream; a duct in said sensing head having its ends terminating in spaced openings in said sensing head, said duct being closed from one of said openings to the other whereby a differential of pressure at said openings will cause passage of fluid through said duct from one opening to the other and fluid passage through said duct is nullified with equal pressure at said openings resulting from symmetrical disposition of said openings with respect to the direction of the fluid stream; first and second resistance elements in spaced relationship longitudinally within said duct so as to be successively contacted by fluid passing through said duct, said resistance elements having the characteristic of change in resistance with change in temperature; a heating element within said duct between said resistance elements; passage of fluid in either direction through said duct causing cooling of the first contacted element of said resistance elements to a greater degree than the second contacted element of said resistance elements; an electrical circuit including said resistance elements and said heating element, said circuit providing an output voltage whose sign reverses in accordance with the direction of fluid flow past said resistance elements; means controlled by said circuit and responsive to changes in said output voltage for moving said sensing head in a direction to establish symmetrical disposition of said openings with respect to the direction of the fluid stream; and means controlled by said circuit for indicating the fluid stream direction.

3. In a fluid stream direction indicator: a sensing head adapted to be exposed to the fluid stream; a duct in said sensing head having its ends terminating in spaced openings in said sensing head, said duct being closed from one of said openings to the other whereby a differential of pressure at said openings will cause passage of fluid through said duct from one opening to the other and fluid passage through said duct is nullified with equal pressure at said openings resulting from symmetrical disposition of said openings with respect to the direction of the fluid stream; first and second thermally sensitive electrical elements in spaced relationship longitudinally within said duct so as to be successively contacted by fluid passing through said duct; an electrical circuit including said thermally sensitive elements; a heating element within said duct between said thermally sensitive elements, passage of fluid in either direction through said duct causing cooling of the first contacted element of said thermally sensitive elements to a greater degree than the second contacted element of said thermally sensitive elements, said circuit providing an output voltage whose sign reverses in accordance with the direction of fluid flow past said thermally sensitive elements; means controlled by said circuit and responsive to changes in said output voltage for moving said sensing head in a direction to establish symmetrical disposition of said openings with respect to the direction of the fluid stream; and means controlled by said circuit for indicating the fluid stream direction.

4. In a fluid stream direction indicator: a sensing head; means pivotally mounting said sensing head in the fluid stream; a duct in said sensing head having its ends terminating in spaced openings in said sensing head, said duct being closed from one of said openings to the other whereby a differential of pressure at said openings will cause passage of fluid through said duct from one opening to the other and fluid passage through said duct is nullified with equal pressure at said openings resulting from symmetrical disposition of said openings with respect to the direction of the fluid stream; first and second heated resistance elements in spaced relationship longitudinally within said duct so as to be successively contacted by fluid passing through said duct, said resistance elements having the characteristic of change in resistance with change in temperature, passage of fluid in either direction through said duct causing cooling of the first contacted element of said resistance elements to a greater degree than the second contacted element of said resistance elements; an electrical circuit including said resistance elements and means for heating such elements, said circuit providing an output voltage whose sign reverses in accordance with the direction of fluid flow past said resistance elements; a reversible motor controlled by said circuit; means connecting said motor to said sensing head for pivotal movement thereof, said circuit being responsive to changes in said output voltage for energizing said motor to move said sensing head in a direction to establish symmetrical disposition of said openings with respect to the direction of the fluid stream; and means controlled by said circuit for indicating the fluid stream direction.

References Cited in the file of this patent

UNITED STATES PATENTS

| Number | Name | Date |
|---|---|---|
| 322,712 | Harris | July 21, 1885 |
| 2,254,155 | Reichel | Aug. 26, 1941 |
| 2,319,516 | Phelps | May 18, 1943 |
| 2,496,339 | De Giers et al. | Feb. 7, 1950 |
| 2,512,278 | Jones | June 20, 1950 |
| 2,513,390 | Young | July 4, 1950 |